United States Patent

Schrenk

[15] 3,687,589
[45] Aug. 29, 1972

[54] APPARATUS FOR THE CONTROLLED EXTRUSION OF MULTI-COMPONENT SYNTHETIC RESINOUS BODIES

[72] Inventor: Walter J. Schrenk, Bay City, Mich.

[73] Assignee: The Dow Chemical Company, Midland, Mich.

[22] Filed: July 20, 1970

[21] Appl. No.: 56,503

Related U.S. Application Data

[60] Division of Ser. No. 811,275, March 10, 1969, Pat. No. 3,555,128, which is a continuation-in-part of Ser. No. 603,981, Dec. 22, 1966, abandoned.

[52] U.S. Cl. ..................425/109, 425/131, 425/198, 425/305, 425/379
[51] Int. Cl. ...............................................B29f 3/02
[58] Field of Search........264/171, 176; 18/13 P, 2 F, 18/15 R, 15 F

[56] References Cited

UNITED STATES PATENTS

| | | |
|---|---|---|
| 2,803,041 | 8/1957 | Hill et al..................18/13 P X |
| 3,320,636 | 5/1967 | Corbett......................18/13 P |
| 3,321,804 | 5/1967 | Breidt et al.................18/13 P |
| 3,346,918 | 10/1967 | Peleuze et al...........18/13 P X |
| 3,405,425 | 10/1968 | Buckley et al..............18/13 P |
| 3,444,031 | 5/1969 | Schrenk..................18/13 P X |
| 3,460,203 | 8/1969 | Losserand..................18/13 P |
| 3,487,505 | 1/1970 | Chisholm et al............18/13 P |

*Primary Examiner*—J. Spencer Overholser
*Assistant Examiner*—B. D. Tobor
*Attorney*—Griswold & Burdick, Richard G. Waterman and Robert B. Ingraham

[57] ABSTRACT

In extrusion of layered film where a layered stream is discharged from a single die, control of the volume of material passing through the feed ports is obtained by introducing varying mechanical shear rates to at least a portion of the individual layers of the composite stream.

4 Claims, 4 Drawing Figures

PATENTED AUG 29 1972

INVENTOR.
Walter J. Schrenk
BY
Robert B. Ingraham
AGENT

INVENTOR.
Walter J. Schrenk
BY
Robert B. Ingraham
AGENT

APPARATUS FOR THE CONTROLLED EXTRUSION OF MULTI-COMPONENT SYNTHETIC RESINOUS BODIES

This application is a divisional application of my co-pending application Ser. No. 811,275, filed Mar. 10, 1969, which in turn is a continuation-in-part application of my earlier application Ser. No. 603,981, filed Dec. 22, 1966, now abandoned.

This invention relates to apparatus for the extrusion of multi-component synthetic resinous bodies, and more particularly relates to apparatus for the extrusion of synthetic resinous multi-component bodies wherein control of the various components is readily achieved.

Many multi-component bodies are prepared from synthetic resinous thermoplastic materials by the simultaneous extrusion of two or more heat plastified components in such a manner that they are combined within a die or like shaping configuration in the thermoplastic stage and subsequently shaped to a desired configuration. Some of such bodies are set forth in U.S. Pat. No. 3,498,873; application Ser. Nos. 445,851, filed Mar. 29, 1965 (now abandoned) and 562,220, filed July 1, 1966 (now abandoned). Oftentimes in the preparation of multi-component bodies, such as layered film, which consist of a plurality of layers of synthetic resinous materials which may be in alternating or other configuration, it is desirable to closely control the thickness of such layers, particularly when optical properties are desired. Generally, the optical properties are closely dependent upon layer thickness of layer configuration. In utilizing conventional extrusion equipment, oftentimes the viscous drag exerted by the force of the extrusion apparatus; that is, in the die and various passages within the die, results in a flow pattern that is undesirable for many given materials at a given temperature. A suitable die and passage configuration may be developed to compensate for wall defects. However, in the preparation of such multi-component products, it is desirable that a single piece of equipment be employed with a variety of synthetic resinous materials and that the temperature of such material in the heat plastified condition can be varied to obtain optimum conditions for each particular batch of resin.

It would be advantageous if there were available apparatus for the extrusion of multi-component synthetic resinous plastic bodies wherein close control of the flow of various streams of heat plastified material within the extrusion apparatus can be maintained.

It would also be advantageous if there were apparatus available for the production of multi-component synthetic resinous articles wherein the various components are present as distinct and separate phases which would permit close control of at least one dimension of the phases.

It would also be advantageous if there were available apparatus for the preparation of synthetic resinous film having a layered structure composed of alternating layers of diverse synthetic resinous material wherein the thickness of such layers could be closely controlled.

These benefits and other advantages in accordance with the present invention are achieved in an apparatus for the simultaneous extrusion of at least two diverse synthetic resinous materials into a composite body, the apparatus comprising at least a first heat plastified synthetic resinous supply means, a second heat plastified synthetic resin supply means adapted to deliver at least a first and a second heat plastified stream, means to divide the first stream and means to divide the second stream into a plurality of substreams, means to re-combine the substreams in a desired relationship into a composite stream, means to deform the composite stream into a desired configuration, the improvement which comprises stream shearing means adapted to selectively apply a shearing force to at least some of the substreams and alter the flow rate thereof.

The apparatus of the present invention beneficially performs a process for the simultaneous extrusion of at least two diverse synthetic resinous materials within a stream deforming configuration whereby at least two streams of diverse synthetic resinous material are each divided into a plurality of streams and subsequently re-combined into a single main stream to form a multi-component main stream of diverse heat plastified synthetic resinous material which is subsequently deformed to provide a product of a desired configuration and cooled below its thermoplastic temperature. At least a portion of the streams formed by subdivision are subjected to varying shear rates by means of mechanical motion of a surface adjacent thereto to thereby provide a desired distribution of the diverse synthetic resinous material within the main stream.

Further features and advantages of the present invention will become more apparent from the following specification taken in connection with the drawing wherein.

Figure 1:
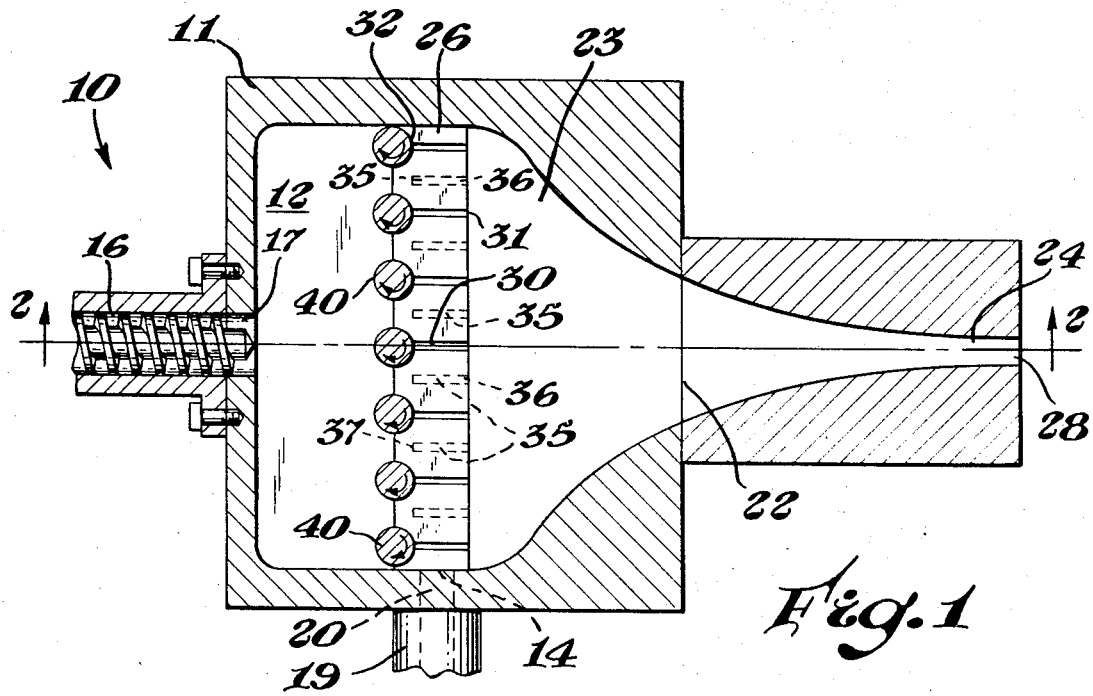
FIG. 1 is a schematic representation of one embodiment of an apparatus in accordance with the invention.

In FIG. 1 there is schematically represented an extrusion apparatus in accordance with the present invention generally designated by the reference numeral 10. The apparatus 10 comprises in cooperative combination an extrusion housing 11. The extrusion housing 11 defines an internal cavity, a first polymer receiving manifold 12 and a second polymer receiving manifold 14. The first polymer receiving manifold 12 is in operative communication with a first heat plastified synthetic resinous material supply source 16 by means of a passageway 17. Beneficially, the supply means 16 is a heat plastified screw extruder or like apparatus. The second polymer receiving manifold 14 is in operative communication with a second source of heat plastified synthetic resinous material 19 by means of a passageway 20 defined by the housing 11. The housing 11 defines a discharge cavity or passageway 22. The discharge cavity 22 has a first or entrance portion 23 and a second or discharge portion 24. In the embodiment depicted in FIG. 1 and 2, the portions 23 and 24 have a generally like configuration. The entrance portion 23 terminates adjacent a feed block and the exit portion 24 terminates adjacent a slot-like discharge or extrusion orifice 28. Thus, the discharge cavity 22 has a double fishtail configuration wherein, in essence, two fishtails are in abutting relationship and lie in planes disposed at 90° from each other. The distribution block 26 separates the manifolds 12 and 14 from the discharge passageway 22 and provides selective communication therebetween. The distribution block 26 defines a plurality of passageways or slots 30 extending between the manifold 12 and the discharge passageway 22. Each of the slots 30 has a discharge or terminal end 31 and an inlet end 32. Interdigital between the slots or passageways 30 are a plurality of slots 35. The slots 35 provide communication between the manifold 14 and the discharge passageway 22. The passageways 35 have a discharge end 36 in communication with the passageway 22 and inlet ends 37 in communication with the manifold 14. The discharge openings 31 and 36 of the passageways 30 and 35 are arranged generally in alternating relationship and discharge in a side by side manner. A mechanical shear producing means 40 is disposed at the inlet opening 32 of each of the passageways 30. The shear producing means beneficially may constitute, as is depicted in FIG. 1, a rotating shaft, an oscillating rod or like means to provide adjacent surfaces which have relative motion, i.e., continuous or continual motion, as heat plastified material is passed therebetween.

Figure 2:
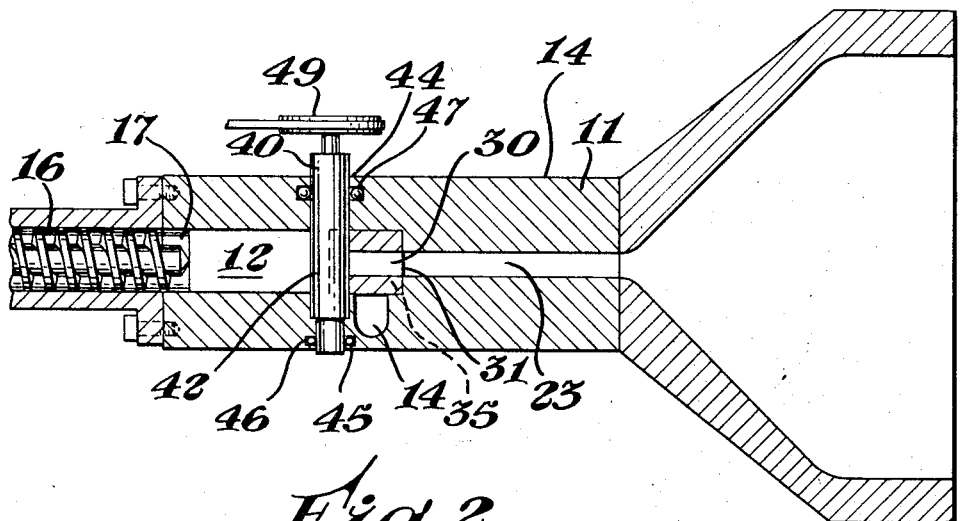
FIG. 2 is a sectional view of the apparatus of FIG. 1 taken along the line 2—2.

In FIG. 2 there is illustrated a view of the apparatus of FIG. 1 taken along the line 2—2 thereof illustrating in further detail the relationship of the slots 30 and 35 and a particular form of shear producing means 40. The shear producing means 40 comprises a generally cylindrical body 42 disposed adjacent and in spaced relationship to the entrance end 32 of a passageway 30. A cylindrical body 42 passes through a first opening 44 in the housing 11 and a second opening 45 defined therein. A first rotary seal 46 and a second rotary seal 47 prevent flow of material from the manifold 12 along the body 42. A rotating means 49 is integrally affixed to the body 42 and provides rotation at a desired rate to provide continuous shear between the body 42 and the adjacent portion of the distribution block 26 defining the slots or passages 30. The rotating means 49 may be any conventional means employed to provide rotary motion at a controlled rate such as an electric motor, a line shaft with variable speed gearing and the like.

Figure 3:
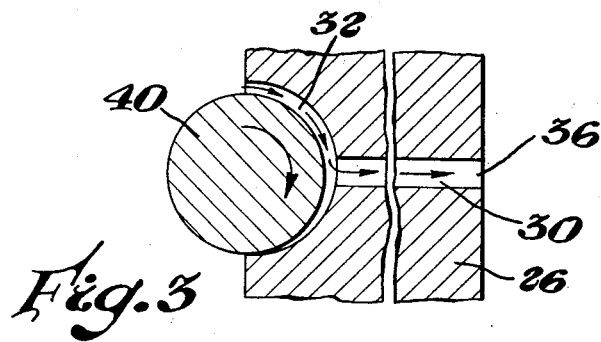
FIG. 3 is a detail of one of the feed slots in the apparatus of FIGS. 1 and 2.

In FIG. 3 there is depicted a fragmentary view of a portion of the feed block 26 depicting the relationship between a slot 30, the inlet end of the slot 32 and the shear producing means 40. The inlet portion of the slot 32 has a generally semi-circular cross-section. The shear producing means 40 is positioned within the entrance end 32 in such a manner that it is asymmetrically located and rotated in the direction indicated by the arrow causing a flow of material into the slot or passageway 30 at a rate more or less proportional to the rate of rotation of the shear producing means 40.

In operation of the apparatus as depicted in accordance with the invention as described in FIGS. 1, 2 and 3, a first synthetic resinous heat plastified material is provided to the manifold 12 through the passageway away from the source 16. A second source 19 provides a second synthetic resinous heat plastified material to the manifold 14. The material from the manifold 12 is forced through the passageways 30 and is discharged as a plurality of generally parallel streams in the first end 23 of the passageway 22. The material from the second manifold 14 passes through the slots or passageways 35 and is discharged as a plurality of streams in the first end 23 of the passageway 22. Thus, the streams from the various passageways 30 and 35 are disposed in alternating or interdigitating arrangement. The configuration of the passageways 22 is such that rotation of the stream laminae does not occur and the generally parallel regions of diverse polymeric material flow toward the second end 24. As they flow toward the second end 24, the configuration of the passageway is such that their thickness decreases and their width increases until at the discharge opening 28 a relatively thin film or sheet is formed wherein a plurality of layers exist, all disposed generally parallel to the major surfaces of the sheet. Selective rotation of the shearing means 40 provides close and accurate control of the relative quantities of material discharged from the first manifold 12 through the various slots 30. Thus, the relative thicknesses of the layers in the resultant film are readily controlled by individually varying the rate of rotation of the shear means 40. As indicated in FIG. 3, rotation of the shear means 40 in the direction indicated by the arrow aids flow of the polymeric material through the slot 30. As the speed of rotation is decreased toward zero, less material flows. A further decrease in the rate of flow is obtained by reversing the direction of rotation of the shear means. Similarly, if desired, suitable shear means may be provided for all or some of the streams of either or both polymeric materials.

Figure 4:
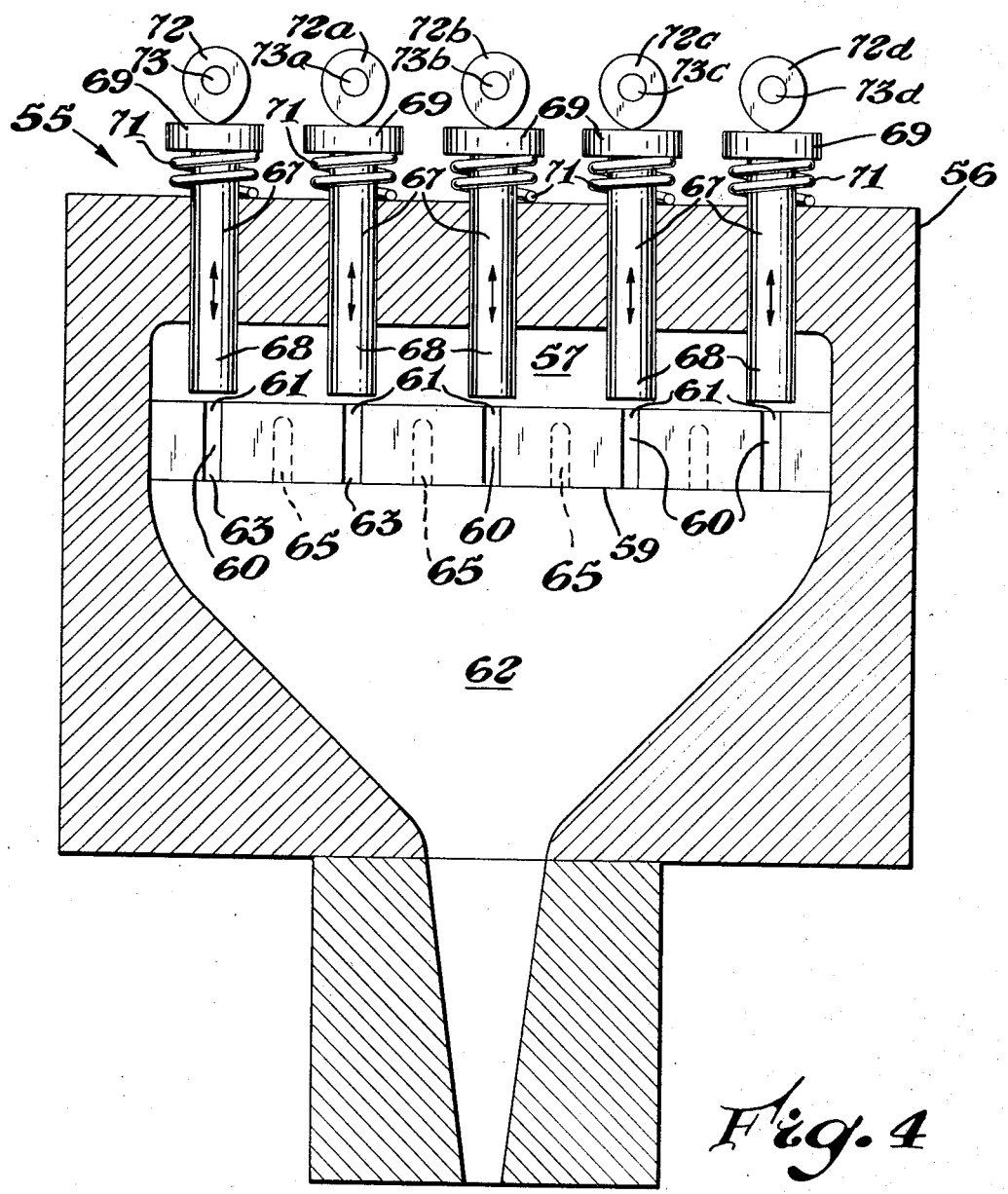
FIG. 4 depicts an alternate embodiment of the invention.

One particularly beneficial and advantageous application of the apparatus such as is depicted in FIG. 1 is in the preparation of a film wherein alternate layers have a monotonically increasing layer thickness such that $$d_n = d_1 + \alpha n$$

where $d_n$ = thickness of $n$th layer
$d_1$ = thickness of 1st layer
$n$ = no. of layer
$\alpha$ = rate of layer thickness increase Employing the arrangement such as is depicted in FIGS. 1, 2 and 3, the characteristics of a smoothly rotating roll are that the pumping rate is generally directly proportional to the shear or speed thereof. Assuming each shear producing means has a like diameter, the speed of the individual rolls is $$W_n = W_1 + \alpha n$$

where $W_n$ = RPM (revolution per minute) or $n$th rotor
$W_1$ = RPM of 1st rotor to give sufficient rate to make $d_1$
$n$ = no. of rotor In FIG. 4 there is depicted a schematic cutaway view of an alternate embodiment of the invention designated by the reference numeral 55. The embodiment 55 comprises a housing 56 defining a first polymer inlet manifold 57. The polymer inlet manifold is in communication with a first heat plastified polymer supply means, not shown. A second polymer supply manifold, not shown, is also defined by the housing 56. A distribution block 59 is disposed within the housing 56. The distribution block 59 defines a plurality of slots or passageways 60 extending from the manifold 57 to a discharge passageway 62 having the general configuration of the discharge passageway 22 of FIG. 1. The slots or passageways 60 have an inlet end 61 communicating with the manifold 57 and discharge openings 63 communicating with the passageway 62. The distribution block 59 defines a plurality of discharge passageways 65. The passageways 65 communicate with the discharge passageway 62 and with the second polymer supply manifold, not shown. A plurality of shearing elements 67 are disposed slidably within the housing 56. The shearing elements 76 have a first end 68. Each shearing element 67 has a second end 69 disposed external to the housing 56. Each shearing element 67 is resiliently urged from the manifold 57 by means of a shearing element retractor 71 or compression spring. Each of the second ends 69 is in operative engagement with cams 72, 72a, 72b, 72c and 72d. The cams 72 are mounted upon rotatable shafts 73, 73a, 73b, 73c and 73d, respectively.

In the operation of the embodiment of the invention as depicted in FIG. 4, heat plastified material is supplied to the manifold 57 and to the second manifold, not shown. Thermoplastic material is forced from the slots 60 and 65 to provide an interdigitating or interleaved arrangement of streams in the passageway 62. The amount of material flowing from the slots 60 is readily varied by increasing or decreasing the amount of shear in the region of the inlet portion 61 of the passageways 60. This is readily accomplished by varying the reciprocating travel of the shear element 67 which is easily controlled by a degree of eccentricity of the cams 72, 72a, 72b, 72c and 72d. Alternatively, cams of like configuration may be employed and the speed of rotation of the shafts such as the shafts 73, 73a, 73b, 73c and 73d varied to give a desired degree of shear.

Employing apparatus in accordance with the present invention such as is depicted in FIGS. 1-4, multi-component layered films such as are described in U.S. Pat. No. 3,498,873; application Ser. Nos. 445,851 (now abandoned) and 562,220 (now abandoned) are prepared while maintaining highly accurate control of the various layer thicknesses.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. An apparatus for the simultaneous extrusion of at least two diverse synthetic resinous materials into a layered composite body, the apparatus comprising
    a first heat plastified synthetic resinous material supply means adapted to deliver a first heat plastified stream,
    a second heat plastified synthetic resinous material supply means adapted to deliver a second heat plastified stream,
    means to divide the first stream and means to divide the second stream into a plurality of substreams each means having an entrance and an exit,
    means to recombine the substreams in a desired relationship into a composite layered stream,
    means to deform the composite layered stream into a desired configuration, the improvement which comprises
    stream shearing means for selectively applying a shearing force, by continual mechanical motion of a surface of said stream shearing means in contact with a stream,
    wherein the stream shearing means comprises at least one moveable body positioned adjacent to, and in spaced relationship to the entrance of a dividing means.

2. The apparatus of claim 1 wherein the means to selectively apply a shearing force comprises at least one rotating element.

3. The apparatus of claim 1 wherein the means to selectively apply a shearing force is a reciprocating element.

4. The apparatus of claim 1 wherein the means to deform the composite stream into a desired configuration comprises
    a housing defining
    a passageway, the passageway having
    an entrance portion and
    a discharge portion, the entrance and discharge portions being of elongate cross-sectional configuration and the cross-sectional configurations lying in planes generally normal to the axis of the passageway, the longitudinal axis of the entrance and discharge cross-sectional configurations being disposed in planes generally normal to each other and containing a longitudinal axis of the passageway.

* * * * *